Patented Dec. 6, 1927.

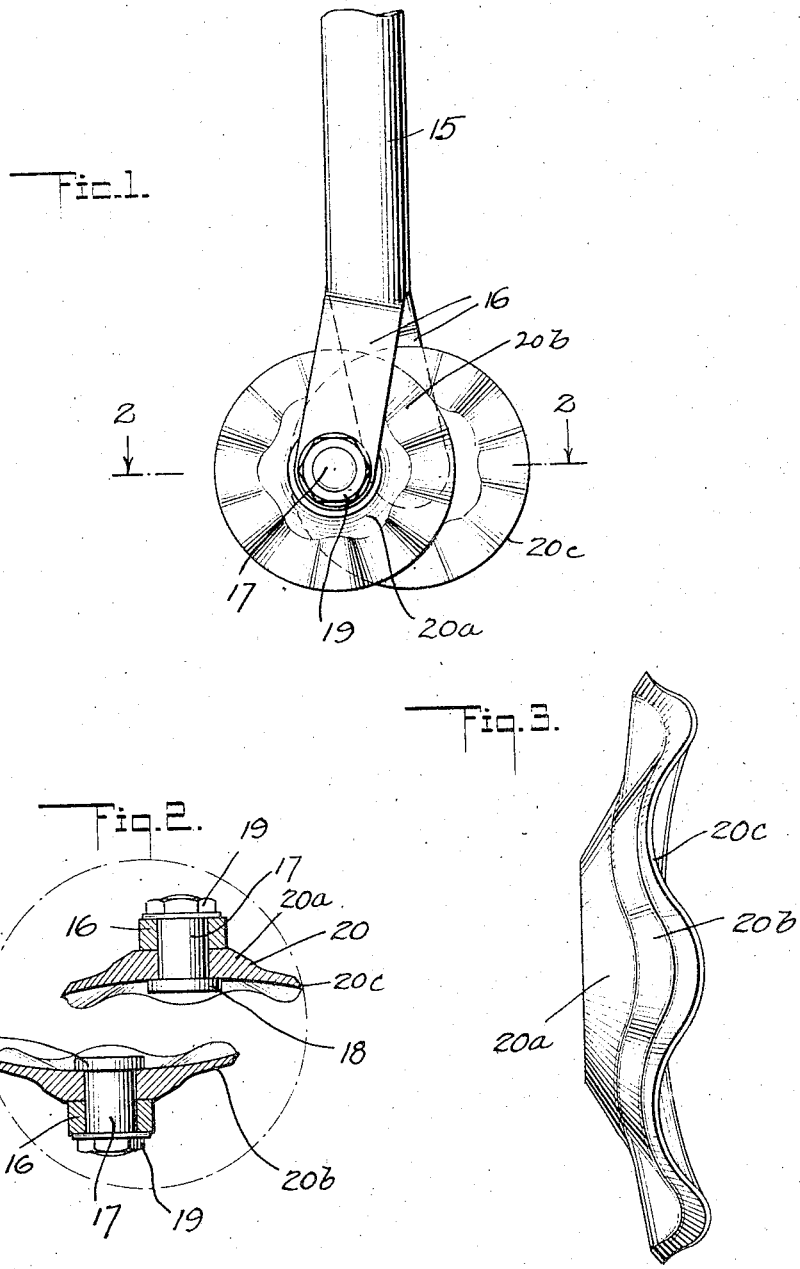

1,651,859

UNITED STATES PATENT OFFICE.

WILLIAM JENNINGS WILSON, OF SOUTHGATE, AND ALLAN J. CARLTON, OF HUNTINGTON PARK, CALIFORNIA, ASSIGNORS TO U. S. TOOL COMPANY, OF LONG BEACH, CALIFORNIA, A CORPORATION OF CALIFORNIA.

ROTARY DISK DRILL.

Application filed August 24, 1925. Serial No. 52,252.

Our invention relates to rotary disk drills as used in well drilling.

A common fault of drills of this character is that frequently they fail to rotate about their own axes while being bodily rotated, thus causing one portion of their cutting edges to have constant engagement with the surface being drilled, in contradistinction to all portions of the cutting edges engaging the surface being drilled, as intended. As a consequence, those portions of the cutting edges held in constant engagement with the surface being drilled become dulled and sometimes broken, and the drill thus fails to properly function.

It is a purpose of our invention to provide a rotary disk drill which eliminates the above recited objection by constructing the bits so that they will have a feeding engagement with the surface being drilled, thereby rendering the axial rotation of the bits positive, and thus insuring of all portions of their cutting edges having cutting engagement with the surface being drilled.

We will describe only one form of rotary disk drill embodying our invention and will then point out the novel features thereof in claims.

In the accompanying drawings,

Figure 1 is a view showing in side elevation one form of rotary disk drill embodying our invention;

Figure 2 is a horizontal sectional view taken on the line 2—2 of Figure 1;

Figure 3 is an enlarged detail view showing in edge elevation one of the bits comprised in the drill shown in the preceding views.

Referring specifically to the drawings, in which similar reference characters refer to similar parts, our invention, in its present embodiment, comprises a shaft or shank or bit body 15 adapted to be connected to suitable means for continuously rotating the drill as a unit in one direction. The lower end of the shank 15 is bifurcated to provide a pair of arms or legs 16 which are bent so that their ends are offset with respect to a line intersecting the transverse axis of the shank. In the free ends of these arms, stub axles or fins 17 are mounted, with one of their ends provided with a flanged head 18 and the opposite end threaded to receive a nut 19, the two co-operating to confine disk cutters 20 thereon and in such manner as to permit free rotation of the cutters.

As illustrated to advantage in Figure 3, each cutter comprises a central portion $20^a$ of substantially conical form and relatively thick, and a marginal edge portion $20^b$ which is corrugated in a circumferential direction with respect to the disk and a free edge of such portion is sharpened to provide a cutting edge $20^c$. Because of the corrugated form of the marginal edge portion $20^b$, it will be clear that the cutting edge $20^c$ is undulated, and it is by means of this undulated cutting edge that the cutter is caused to function as intended.

In practice, the drill upon being rotated effects a bodily rotation of the drill cutters 20, and with their cutting edges $20^c$ in engagement with the wall of the well or the surface to be drilled, it will be clear that the cutters function to drill such surface. Because of the undulated contour of the cutting edges, such edges when in engagement with the surface being drilled will, under the rotative bodily movement of the cutter, set up a feeding action which effects positive rotation of the cutter about its own axis so that all portions of the cutting edge are successively presented to the surface being drilled as the cutter is bodily rotated. In this manner, the rotation of the cutters about their own axes is insured at all times to cause their cutting edges to properly function and in a manner to prevent locking against rotation, and the consequent disadvantages as previously pointed out.

It is thus seen that the present invention embodies a drilling bit having peripherally corrugated cutting disks rotatably mounted on the body of the bit and that such disk cutters are mounted by arms or legs which are offset to advance the cutters and to maintain the cutters spaced apart. Moreover, the cutters are corrugated in their outer portion only and the inner ends of the corrugations terminate at a point or such distance from the center thereof and with the surface of revolution generated by said region after the corrugated portion is worn away will contain the lower portion of the body entirely within it. Moreover, such portion of the disk cutter is substantially increased in thickness over the thickness of the corrugated portion of the cutter.

The disk bit of the present invention has the advantages that in certain formations it will have a more rapid drilling speed than the normal types of disk bits. It also has the advantage that whenever the relatively thin corrugated portion of the cutter is worn away, the bit will then substantially discontinue drilling. This will indicate to the driller at the top of the well the worn state of the cutters of the bit before the drilling is continued to such a point that the bit body will be substantially worn. By this means, the driller is prevented from drilling an excessively small size well hole which is difficult to ream. The disk cutters of the present invention are of the shearing type as distinguished from the types of crushers or rollers used upon certain drilling bits intended for operation in formations of exceptional hardness.

Although we have herein shown and described only one form of rotary disk drill embodying our invention, it is to be understood that various changes and modifications may be made therein without departing from the spirit of the invention and the spirit and scope of the appended claims.

We claim as our invention:

1. A rotary drill bit comprising a body portion, a peripherally corrugated cutter disk rotatably mounted on the body, the region of transition from the central non-corrugated portion to the peripheral corrugated portion being much smaller than the radius of the disk and occurring at such a distance from the center thereof that the surface of the revolution generated by said region after the corrugated portion is worn away will contain the lower portion of the body entirely within it.

2. A rotary drilling bit comprising a body, disk cutters mounted on the body and extending therebelow, the disk cutters having corrugated cutting edges, the corrugations extending inwardly for only a portion of the width of the cutters, the inner ends of the corrugations terminating below the end of the body, the thickness of the cutters being increased at the ends of the corrugations.

3. A rotary drilling bit comprising a body and a rotary cutter for a drilling bit having a thickened central portion surrounded by a corrugated portion terminating in a continuous corrugated cutting edge, the thickness of the cutter being substantially increased at the inner ends of the corrugations at a point below the lowest point of the body when the bit is in cutting position in a wall.

4. A rotary drilling bit comprising a body having a pair of offset legs extending below the body and twisted one in advance of the other, a disk cutter separately mounted by each leg, the disk cutters being spaced apart, each disk cutter having a thickened central portion surrounded by a peripherally corrugated portion terminating in a continuous corrugated cutting edge, the thickness of the cutters being substantially increased at the inner ends of the corrugations at a point below the lowest point of the body when the bit is in cutting position in a well.

5. A rotary well drilling bit comprising a body having a pair only of legs extending therebelow and offset to position the legs one in advance of the other, a single disk cutter carried by each leg on its inner side, the disk cutters being spaced apart and in substantially vertical planes, each disk cutter having a thickened central portion surrounded by a corrugated portion terminating in a continuous corrugated cutting edge, the thickness of the cutter being substantially increased at the inner ends of the corrugations at a point below the lowest point of the body when the bit is in cutting position in a well.

ALLAN J. CARLTON.
WILLIAM J. WILSON.